United States Patent
Davie

(10) Patent No.: US 6,707,858 B1
(45) Date of Patent: Mar. 16, 2004

(54) LOW IF RECEIVER

(75) Inventor: Alan J. Davie, East Grinstead (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/377,361

(22) Filed: Aug. 19, 1999

(30) Foreign Application Priority Data

Aug. 25, 1998 (GB) .............................................. 9818400

(51) Int. Cl.$^7$ .............................. H04B 1/00; H04B 1/26; H03K 9/02
(52) U.S. Cl. ........................ 375/316; 375/337; 455/207; 455/318; 330/129
(58) Field of Search ................................. 375/316, 344, 375/140; 330/129; 455/296, 318

(56) References Cited

U.S. PATENT DOCUMENTS

| | | | | |
|---|---|---|---|---|
| 3,961,262 A | * | 6/1976 | Gassmann | .................. 455/207 |
| 4,523,324 A | * | 6/1985 | Marshall | ...................... 375/337 |
| 4,736,390 A | * | 4/1988 | Ward et al. | .................. 375/316 |
| 5,617,060 A | * | 4/1997 | Wilson et al. | ............... 330/129 |
| 6,385,442 B1 | * | 5/2002 | Vu et al. | ..................... 455/318 |

* cited by examiner

Primary Examiner—Stephen Chin
Assistant Examiner—Edith Chang
(74) Attorney, Agent, or Firm—Dicran Halajian

(57) ABSTRACT

A low IF receiver frequency translates an input signal in quadrature related mixers, filters in respective low pass channel filters, and derotates to produce a wanted signal and its image. At switch-on, the receiver is operated as a zero IF receiver in order to determine which of the adjacent channels to the wanted channel has the smaller interferer, and the local oscillator frequency supplied to the mixers is then adjusted to bring that interferer into the channel bandwidth of the low pass channel filters.

14 Claims, 3 Drawing Sheets

LOW IF RECEIVER

Figure 1:
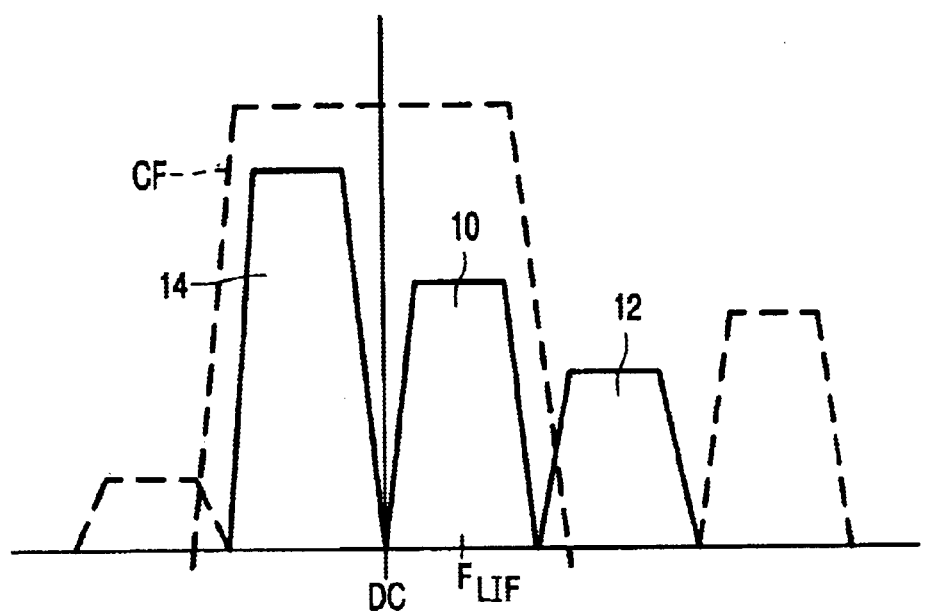

The present invention relates to a low IF receiver having particular, but not exclusive, application in selective call receivers, such as wide area digital pagers, and to integrated circuits embodying such receivers.

In order to meet the ever-increasing demands for greater levels of integration with fewer off-chip components, radio receivers are increasingly moving to architectures such as low IF. These receivers, unlike traditional superhet designs, benefit because all the required channel filtering can be performed on chip. However, one feature of this type of receiver is that the image frequency is always relatively close to the wanted signal and is often arranged to be one of the adjacent channels. As a result, separation of the wanted frequency from the image frequency by filtering at RF is impracticable. Instead low IF receivers usually rely on removing the image frequency at base band using cancellation techniques.

One characteristic of a low IF receiver is that it relies on good internal matching in its quadrature architecture to achieve high levels of adjacent channel rejection. This means that in situations where the image channel is large relative to the wanted channel some of the interferer in the image channel can find its way into the wanted signal spectrum. This results in a degradation in bit error rates at the output of the demodulator. Depending on the intended usage of a receiver, in some systems the receiver is never expected to cope with large adjacent channel interferers but in other systems such as paging the adjacent channel specification for the receiver is very stringent.

An object of the present invention is to improve adjacent channel rejection in integrated low IF receivers.

According to a first aspect of the present invention there is provided a quadrature receiver which is adaptable to operate as a low IF receiver for data reception and to operate as a zero IF receiver for image channel measurement.

More particularly, there is provided a low IF receiver comprising first and second mixing means, a source of quadrature related local oscillator signals having first and second outputs coupled to the first and second mixing means, respectively, channel filtering means coupled to outputs of the first and second mixing means, signal derotation means coupled to the channel filtering means, the derotation means having first and second outputs, means for causing the mode of operation of the receiver to be changed from a low IF receiver to a zero IF receiver in order to determine the relative amplitudes of adjacent channel signals by altering the local oscillator frequency to locate the wanted channel substantially symmetrically about DC, widening the bandwidth of the channel filtering means to include the channels adjacent the wanted channel and inserting a DC notch in the signal paths from the first and second mixing means to substantially block the wanted channel, the respective adjacent channel signals appearing on a respective first and second outputs of the derotation means, means for determining which of the signals on the first and second outputs has the smaller relative amplitude and the receiver reverting to its low IF mode by altering the local oscillator frequency appropriately to pass the wanted channel and the smaller of the adjacent channel signals, by restoring the bandwidth of the channel filtering means and by removing the DC notch.

In implementing the receiver made in accordance with the present invention the local oscillator may comprise a frequency synthesizer and in changing the mode of operation from zero IF to low IF only one switching of the synthesizer occurs which reduces the overall level of interference generated and also enables the receiver to be switched to its data receiving mode fairly rapidly.

According to a second aspect of the present invention there is provided an integrated circuit comprising a quadrature receiver which is adaptable to operate as a low IF receiver for data reception and to operate as a zero IF receiver for image channel measurement.

The second aspect of the present invention also provides an integrated circuit comprising a low IF receiver comprising first and second mixing means, means for connecting the first and second mixing means to a source of quadrature related local oscillator signals, channel filtering means coupled to outputs of the first and second mixing means, signal derotation means coupled to the channel filtering means, the derotation means having first and second outputs, means for causing the mode of operation of the receiver to be changed from a low IF receiver to a zero IF receiver in order to determine the relative amplitudes of adjacent channel signals by providing a control signal for altering the local oscillator frequency to locate the wanted channel symmetrically about DC, by widening the bandwidth of the channel filtering means to include the channels adjacent the wanted channel and by inserting a DC notch in the signal paths from the first and second mixing means to substantially block the wanted channel, the respective adjacent channel signals appearing on a respective first and second outputs of the derotation means, means for determining which of the signals on the first and second outputs has the smaller relative amplitude and the receiver reverting to its low IF mode by providing another control signal for altering the local oscillator frequency appropriately to pass the wanted channel and the smaller of the adjacent channel signals, by restoring the bandwidth of the channel filtering means and by removing the DC notch.

According to a third aspect of the present invention there is provided a method of operating a low IF receiver comprising:

(a) reconfiguring the receiver to operate as a zero IF receiver by adjusting a local oscillator frequency so that the wanted channel and unwanted adjacent channels are selected, (b) determining which of the adjacent channels is the smaller, and (c) reconfiguring the receiver to operate as a low IF receiver with the local oscillator frequency selected to pass the wanted channel and the smaller of the adjacent channels.

The third aspect of the present invention further provides a method of operating a low IF receiver having frequency translation means including a source of local oscillator signals, channel filtering means coupled to the frequency translation means, signal derotation means coupled to the channel filtering means, the signal derotation means having first and second outputs, the method comprising:

(a) reconfiguring the receiver to operate as a zero IF receiver by altering the local oscillator frequency to locate the wanted channel substantially symmetrically about DC, by widening the bandwidth of the channel filtering means to include channels adjacent the wanted channel and by inserting a DC notch substantially blocking the wanted channel in the outputs of the frequency translation means, (b) determining the smaller of the signals on the first and second outputs of the signal derotation means, and (c) reconfiguring the receiver to operate as a low IF receiver by altering the local oscillator frequency such that the frequency translation means passes the wanted channel signal and the smaller of the adjacent channel signals, by restoring the bandwidth of the channel filtering means and by removing the DC notch.

Figure 2:
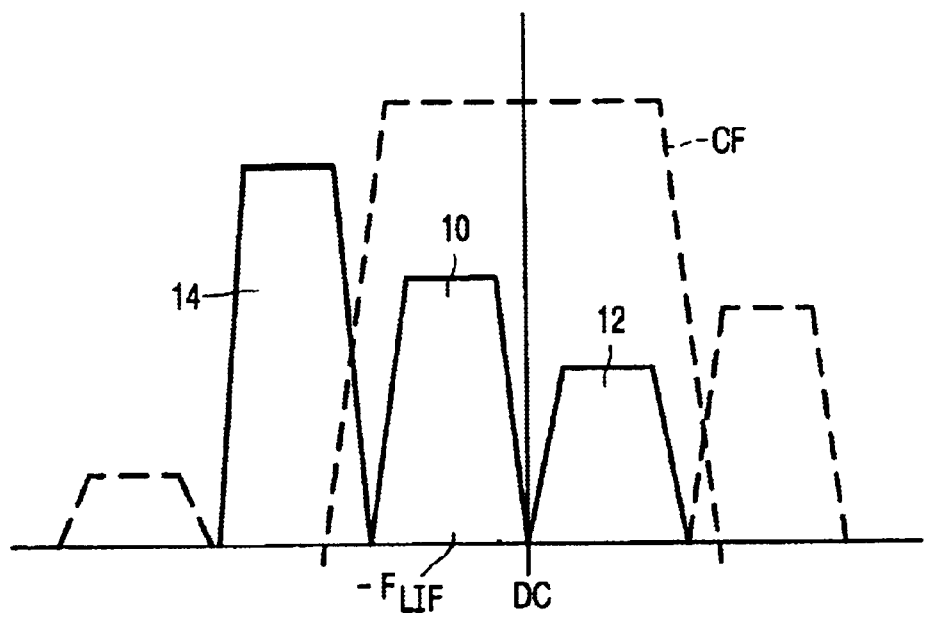
Figure 3:
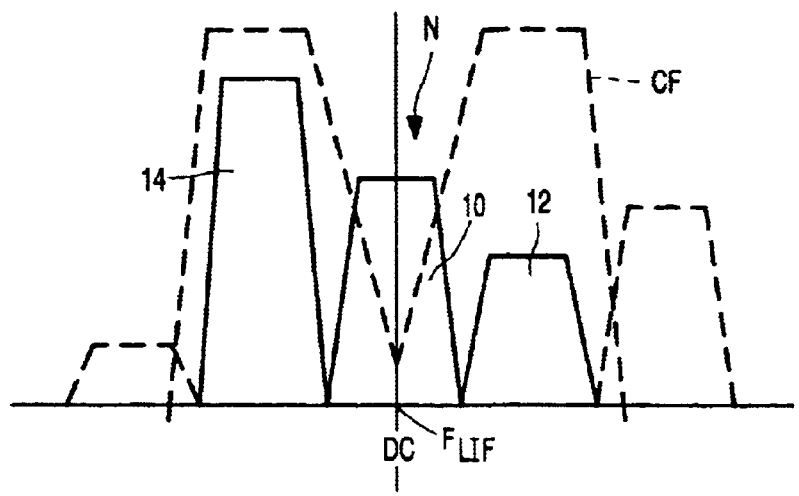
Figure 4:
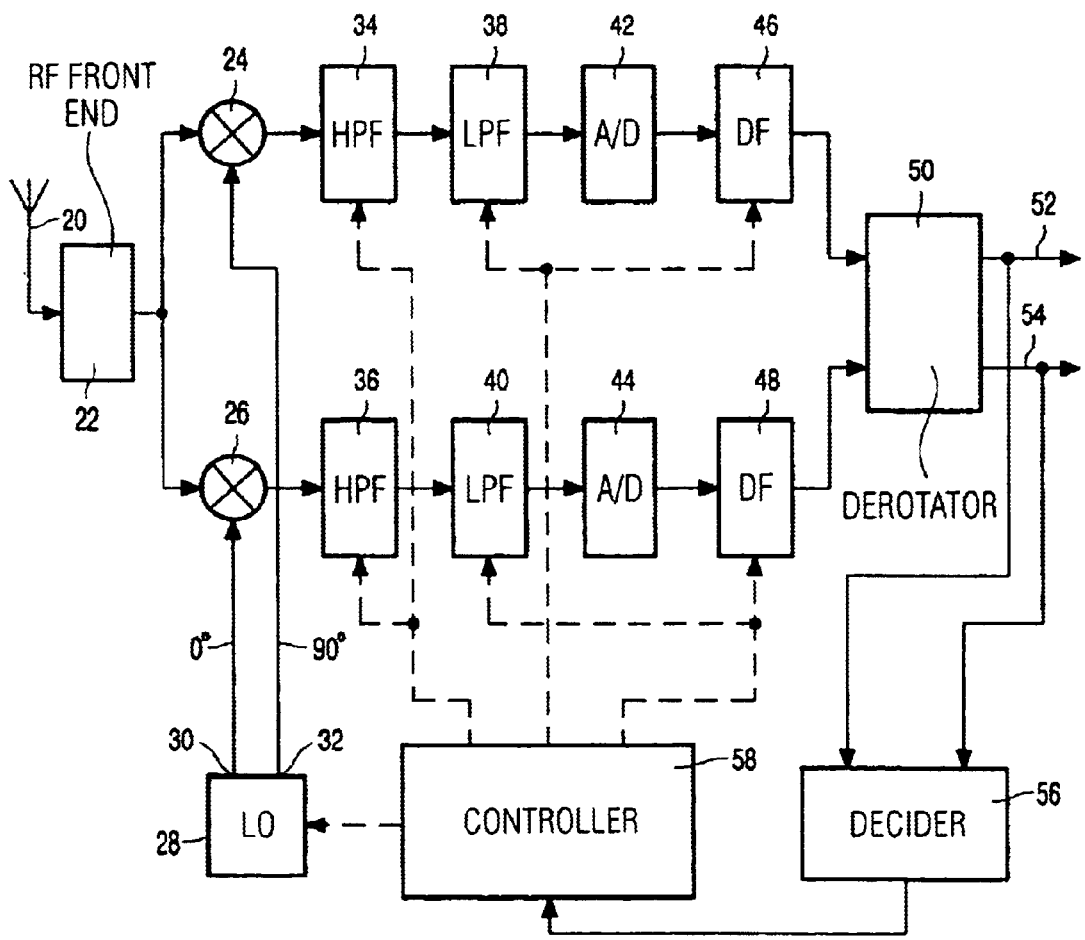
Figure 5:
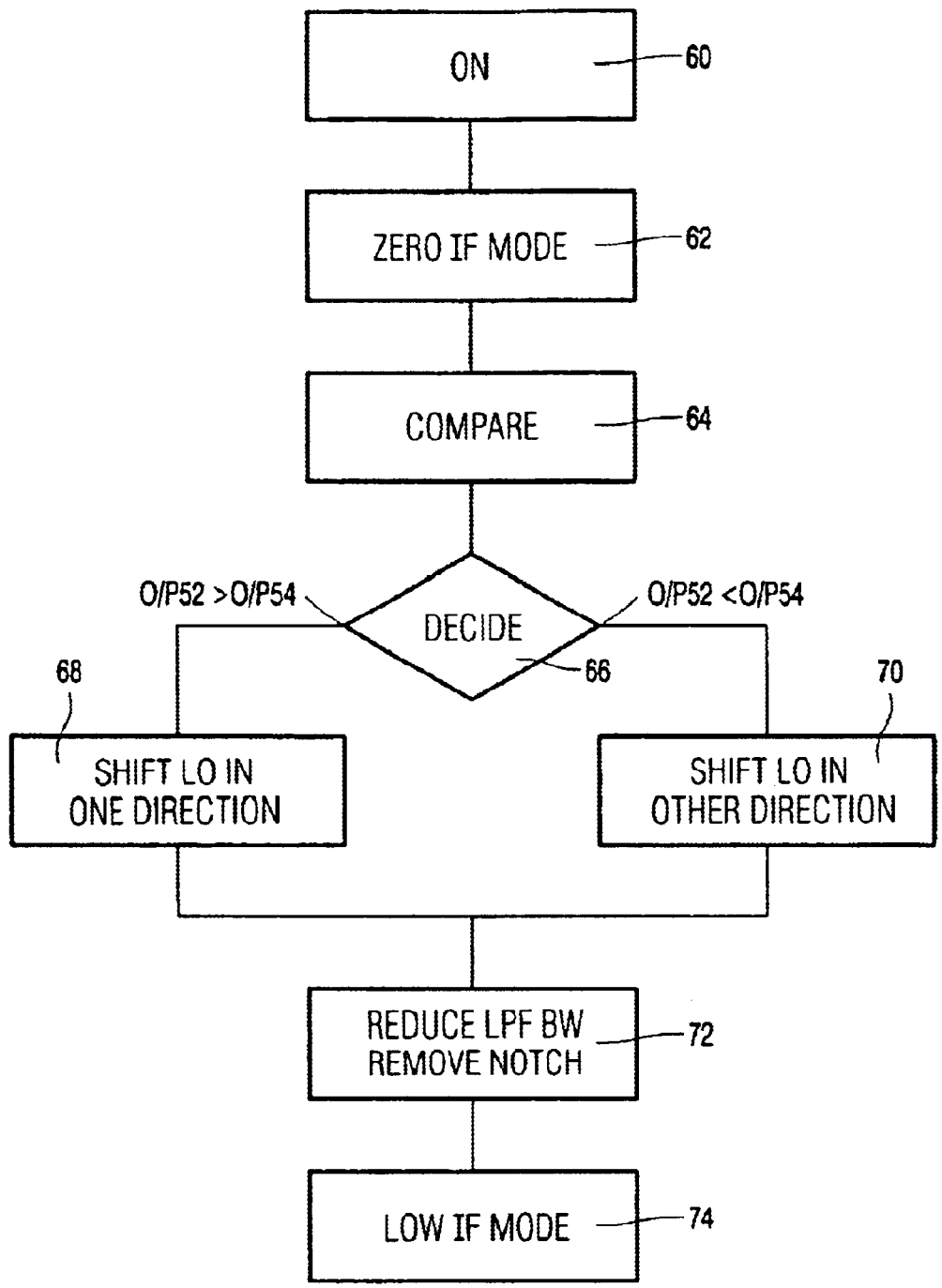

The present invention will now be described, by way of example, with reference to the accompanying drawings, wherein:

FIG. 1 is a graph of frequency versus amplitude showing the presence of a high level interferer on the image frequency, FIG. 2 is a graph of frequency versus amplitude showing the presence of a low level interferer on the image frequency, FIG. 3 is a frequency versus amplitude graph illustrating the receiver operating as a zero IF receiver, FIG. 4 is a block schematic diagram of an embodiment of a low IF receiver made in accordance with the present invention, and FIG. 5 is a flow chart illustrating the various operations from the point at which the low IF receiver is switched on until it is ready to receive data.

In the drawing the same reference numerals have been used to indicate corresponding features.

FIG. 1 illustrates the situation where a wanted signal 10 is frequency translated to a low IF $F_{LIF}$ and unwanted adjacent channel signals 12, 14 are translated to adjacent channels one on either side of the wanted signal. In this example adjacent channel signal 12 is smaller than the wanted signal 10 and the adjacent channel signal 14 is larger than the wanted signal 10. A low pass channel filter characteristic CF is disposed symmetrically about DC and its pass band includes the wanted signal 10 centred on a positive low IF, $F_{LIF}$, and the unwanted adjacent channel 14 as the image signal. In such a situation a demodulator of a receiver is having to cope with an interfering signal of greater amplitude than the wanted signal 10.

FIG. 2 shows the converse situation where the local oscillator frequency has been altered so that the frequency translated wanted signal 10 is centred on the negative low IF, $-F_{LIF}$. As a consequence the lower amplitude, unwanted channel 12 lies within the bandwidth of the channel filter characteristic CF. From the point of view of demodulating signals it is preferable for the interfering signal to have a smaller amplitude relative to the wanted signal 10. In the examples illustrated, FIG. 2 is better than FIG. 1 thus by altering the frequency of the local oscillator by one channel spacing it is possible to measure the amplitudes of the interferers in the adjacent channels 12, 14, relative to the wanted signal 10 and to make a decision as to which local oscillator frequency offers the lower level of interference.

In a telecommunications environment having time division protocols a decision as to which local oscillator frequency to select would have to be made relatively quickly otherwise data will be lost. One option which entails measuring the relative amplitudes of both adjacent channels independently and then making a decision is not viable because it would take too long. The alternative of measuring both channels simultaneously in parallel receiver chains is quicker but is regarded as being prohibitively expensive.

FIG. 3 illustrates a technique where a single receiver can select both adjacent channels simultaneously and their relative amplitudes are compared thus enabling the receiver to select a local oscillator frequency giving an image frequency position having a lower level of interference. The principle behind this technique is based on whenever the receiver is switched on, a channel is changed or the currently selected channel is deemed unsatisfactory, the receiver temporarily changes from being a low IF receiver to being a zero IF receiver by shifting the local oscillator frequency by half a channel width so that the IF frequency $F_{IF}$ and the wanted channel are located symmetrically about DC with the unwanted adjacent channels 12, 14 on each side of the wanted channel 10. Simultaneously the channel filter bandwidth CF is widened from that shown in FIGS. 1 and 2 to include the unwanted channels 12 and 14. Also to avoid the wanted channel 10 interfering with the measurement process associated with determining the smaller of the unwanted channels, it is effectively eliminated by a DC notch N created by means of high pass filters. The respective channels are derotated in the receiver thereby producing each unwanted channel 12, 14 on a respective output. The unwanted channels are compared and a decision is made as to which is the smaller interferer, in this example channel 12, and the local oscillator frequency is chosen to shift the IF above or below DC and the receiver reverts to being a low IF receiver. Simultaneously the high pass filtering means is removed and the bandwidth CF of the channel filter is reduced so that the receiver operates in the mode illustrated in FIG. 2.

FIG. 4 illustrates an embodiment of a receiver made in accordance with the present invention. A signal received by an antenna 20 is supplied to a RF front end 22 the output of which is divided and supplied to quadrature related mixers 24, 26. A local oscillator 28 consisting of a frequency synthesizer has an in-phase output 30 supplied to the mixer 26 and a 90 degrees phase output which is supplied to the mixer 24. The signal paths from the mixers 24, 26 are identical and for the convenience of description one path will be described and the reference numerals identifying the corresponding stages in the other signal path will be included in parenthesis. Each signal path comprises switchable high pass filtering means 34 (36), the output from which is connected to a low pass channel filter 38 (40), whose channel filter bandwidth CF is switchable from narrow to wide and back. The signals from the low pass channel filter 38 (40), are over-sampled and digitised in an analogue to digital converter 42 (44) and are then filtered in a decimating filter 46 (48). A derotate stage 50 is coupled to outputs of the decimating filters 46, 48 to produce in the normal data receiving mode the wanted signal on an output 52 and an image signal on output 54. The derotate stage 50 relies on cancellation of signals and by digitising the output from the channel filters 38, 40, mismatches in the quadrature signal paths can be cancelled thereby facilitating obtaining the wanted and image signals.

The outputs 52, 54 are coupled to a decision stage 56 the output of which is supplied to a control stage 58 having control signal outputs coupled to the local oscillator 28, the switchable high pass filtering means 34, 36, the low pass filters 38, 40 and the decimating filters 46, 48.

At switch-on of the receiver the control stage 58 causes the receiver to behave as a zero IF receiver and in so doing the local oscillator frequency is shifted by half a channel bandwidth, the high pass filtering means 34, 36 are connected in the circuit from the mixers 24, 26 to introduce a DC notch into the signal output, the channel bandwidth CF of the low pass channel filters 38, 40 is widened as shown in FIG. 3 and a corresponding change is made to the decimating filters 46, 48. As a consequence of these changes the unwanted interferers 12, 14 appear on the respective outputs 52, 54. They are compared in the decision stage 56 and an output is produced instructing the control stage 58 to adjust the local oscillator frequency by half a channel bandwidth either in a positive or negative direction to include the smaller interferer in the reduced channel bandwidth CF of the low pass channel filters 38, 40. Simultaneously the high pass filters 34, 36 are switched out of circuit thereby removing the notch centred at DC and also the bandwidth of the decimating filters 46, 48 is reduced. Thereafter the receiver operates as a low IF receiver producing wanted data on one of the outputs 52, 54 and the unwanted image data on the other of the outputs 54, 52.

The above described operations are summarised in the flow chart shown in FIG. 5 in which block 60 represents the receiver being switched-on. Block 62 represents the operations of changing the receiver to its zero IF mode, that is, altering the local oscillator frequency so that the wanted signal 10 is symmetrical about DC, widening the bandwidth of the filters 38, 40, 46 and 48 and switching-in the high pass filtering means 34, 36 to create a notch about DC. Block 64 denotes the operation of comparing the signal on the output 52 with that on the output 54 in the decision stage. In block 66 it is determined which of the outputs is the bigger. If output 52 is greater than the output 54, that is O/P52>O/P54, the local oscillator frequency is shifted by half a channel width to one side, block 68. Alternatively if the output 52 is smaller than the output 54, that is O/P52<O/P54, then in block 70 the local oscillator frequency is shifted to the other side by half a channel. Block 72 represents reducing the bandwidths of the filters 38, 40, 46 and 48 and the switching out of the high pass filtering means 34, 36 to remove the notch. Finally block 74 indicates the receiver operating in a low IF mode and receiving data in the normal way.

Optionally the receiver may include signal quality measuring means which determines if a channel search should be made due to the received signal quality deteriorating.

In a non-illustrated embodiment the derotation stage 50 comprises an analogue stage which derotates the outputs from the channel filters 38, 40 without having to digitise them.

In the present specification and claims the word "a" or "an" preceding an element does not exclude the presence of a plurality of such elements. Further, the word "comprising" does not exclude the presence of other elements or steps than those listed.

From reading the present disclosure, other modifications would be apparent to a person skilled in the art. Such modifications may involve other features which are already known in the design, manufacture and use of low IF receivers and components parts thereof and which may be used instead of or in addition to features already described herein.

What is claimed is:

1. A quadrature receiver comprising:
   first operating means for operating as a low IF receiver for data reception,
   second operating means for operating as a zero IF receiver for measurement of unwanted signals for determining a lower one of the unwanted signals, and
   means for reverting back to operate as said low IF receiver for processing said data and said lower one of the unwanted signals, wherein said second operating means reconfigures the receiver at switch on to operate as the zero IF receiver.

2. A receiver which is adaptable to operate as a low IF receiver for data reception and to operate as a zero IF receiver for image channel measurement, wherein the receiver includes frequency translation means, channel filtering means for filtering output signals from the frequency translation means, and derotation means having first and second outputs, which when the receiver is operating as a low IF receiver respectively produce the wanted signal and an unwanted image signal and when operating as a zero IF receiver respectively produce signals, when present, in higher and lower adjacent channels.

3. A receiver as claimed in claim 2, wherein when operating as a zero IF receiver, the bandwidth of channel filtering means is wider than when operating as a low IF receiver and in that a DC notch is provided in the channel bandwidth when operating as a zero IF receiver to essentially block the wanted channel.

4. A low IF receiver comprising first and second mixing means, a source of quadrature related local oscillator signals having first and second oscillating outputs coupled to the first and second mixing means, respectively, channel filtering means coupled to outputs of the first and second mixing means, signal derotation means coupled to the channel filtering means, the derotation means having first and second derotated outputs, means for causing the mode of operation of the receiver to be changed from a low IF receiver to a zero IF receiver in order to determine the relative amplitudes of adjacent channel signals by altering the local oscillator frequency to locate the wanted channel substantially symmetrically about DC, widening the bandwidth of the channel filtering means to include the channels adjacent the wanted channel and inserting a DC notch in signal paths from the first and second mixing means to substantially block the wanted channel, the respective adjacent channel signals appearing on a respective of said first and second derotated outputs of the derotation means, means for determining which of the signals on the first and second derotated outputs has the smaller relative amplitude and the receiver reverting to its low IF mode by altering the local oscillator frequency appropriately to pass the wanted channel and the smaller of the adjacent channel signals, by restoring the bandwidth of the channel filtering means and by removing the DC notch.

5. A receiver as claimed in claim 4, wherein the derotation means comprises a digital denotation means, and wherein digitising means are coupled to outputs of the channel filtering means for digitising signals to be applied to the digital derotation means.

6. A receiver as claimed in claim 4, wherein the means for inserting a DC notch comprises respective high pass filtering means coupled into the signal paths of the first and second mixing means when the receiver is operating as a zero IF receiver.

7. An integrated circuit comprising a quadrature receiver, said receiver comprising:
   first operating means for operating as a low IF receiver for data reception,
   second operating means for operating as a zero IF receiver for measurement of unwanted signals for determining a lower one of the unwanted signals, and
   means for reverting back to operate as said low IF receiver for processing said data and said lower one of the unwanted signals, wherein said second operating means reconfigures the receiver at switch on to operate as the zero IF receiver.

8. An integrated circuit comprising a low IF receiver comprising first and second mixing means, means for connecting the first and second mixing means to a source of quadrature related local oscillator signals, channel filtering means coupled to outputs of the first and second mixing means, signal derotation means coupled to the channel filtering means, the derotation means having first and second derotated outputs, means for causing the mode of operation of the receiver to be changed from a low IF receiver to a zero IF receiver in order to determine the relative amplitudes of adjacent channel signals by providing a control signal for altering the local oscillator frequency to locate the wanted channel symmetrically about DC, by widening the bandwidth of the channel filtering means to include the channels adjacent the wanted channel and by inserting a DC notch in signal paths from the first and second mixing means to substantially block the wanted channel, the respective adjacent channel signals appearing on a respective of said first and second derotated outputs of the derotation means, means for determining which of the signals on the first and second derotated outputs has the smaller relative amplitude and the receiver reverting to its low IF mode by providing another control signal for altering the local oscillator frequency appropriately to pass the wanted channel and the smaller of the adjacent channel signals, by restoring the bandwidth of the channel filtering means and by removing the DC notch.

9. A method of operating a low IF receiver comprising:
  (a) reconfiguring the receiver to operate as a zero IF receiver by adjusting a local oscillator frequency so that the wanted channel and unwanted adjacent channels are selected,
  (b) determining which of the adjacent channels is the smaller, and
  (c) reconfiguring the receiver to operate as a low IF receiver with the local oscillator frequency selected to pass the wanted channel and the smaller of the adjacent channels.

10. A method of operating a low IF receiver having frequency translation means including a source of local oscillator signals, channel filtering means coupled to the frequency translation means, signal derotation means coupled to the channel filtering means, the signal derotation means having first and second outputs, the method comprising:
  (a) reconfiguring the receiver to operate as a zero IF receiver by altering the local oscillator frequency to locate the wanted channel substantially symmetrically about DC, by widening the bandwidth of the channel filtering means to include channels adjacent the wanted channel and by inserting a DC notch substantially blocking the wanted channel in the outputs of the frequency translation means,
  (b) determining the smaller of the signals on the first and second outputs of the signal derotation means, and
  (c) reconfiguring the receiver to operate as a low IF receiver by altering the local oscillator frequency such that the frequency translation means passes the wanted channel signal and the smaller of the adjacent channel signals, by restoring the bandwidth of the channel filtering means and by removing the DC notch.

11. A receiver comprising:
  first reconfiguring means the receiver to operate as a zero IF receiver by adjusting a local oscillator frequency so that a wanted channel and unwanted adjacent channels are selected;
  means for determining which of the unwanted adjacent channels is the smaller; and
  second reconfiguring means the receiver to operate as a low IF receiver with the local oscillator frequency selected to pass the wanted channel and the smaller of the unwanted adjacent channels, wherein said first reconfiguring means reconfigures the receiver at switch on to operate as the zero IF receiver.

12. The receiver of claim 11, wherein said first reconfiguring means adjusts said local frequency by half a channel bandwidth.

13. The receiver of claim 11, wherein said first reconfiguring means introduces a high a DC notch into a signal provided from at least one mixer.

14. A receiver comprising:
  first reconfiguring means for reconfiguring the receiver to operate as a zero IF receiver by adjusting a local oscillator frequency so that a wanted channel and unwanted adjacent channels are selected;
  means for determining which of the unwanted adjacent channels is the smaller; and
  second reconfiguring means for reconfiguring the receiver to operate as a low IF receiver with the local oscillator frequency selected to pass the wanted channel and the smaller of the unwanted adjacent channels, wherein said first reconfiguring means widens a bandwidth of a filter that receives a signal from at least one mixer.

* * * * *